US012741634B2

(12) United States Patent
Oka et al.

(10) Patent No.: US 12,741,634 B2
(45) Date of Patent: Sep. 22, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Keisuke Oka, Wako (JP); Masayuki Nakatsuka, Wako (JP); Shinya Maruo, Wako (JP); Shunya Ishikawa, Wako (JP); Yohei Kitahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 18/842,818

(22) PCT Filed: Mar. 18, 2022

(86) PCT No.: PCT/JP2022/012655
§ 371 (c)(1),
(2) Date: Aug. 30, 2024

(87) PCT Pub. No.: WO2023/175917
PCT Pub. Date: Sep. 21, 2023

(65) Prior Publication Data
US 2025/0178598 A1 Jun. 5, 2025

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); (Continued)

(58) Field of Classification Search
None
See application file for complete search history.

(56) References Cited

U.S. PATENT DOCUMENTS 6,169,478 B1 * 1/2001 Hada ..................... G01S 13/865 340/436
8,423,231 B2 * 4/2013 Breuer .................. B60T 17/221 340/901
(Continued)

FOREIGN PATENT DOCUMENTS

CN 112277937 A * 1/2021 ............ B60W 30/09
CN 109552321 B * 1/2022 ............ B60W 30/09
(Continued)

OTHER PUBLICATIONS

International Search Report and Written Opinion for International Application No. PCT/JP2022/012655 mailed on May 24, 2022, 8 pages.

*Primary Examiner* — Kevin R Steckbauer
(74) *Attorney, Agent, or Firm* — Amin, Turocy & Watson, LLP

(57) ABSTRACT

A driving assistance device performs either or both of performing braking control to instruct a vehicle to stop the vehicle when a degree of approach between the vehicle and a target object satisfies a first condition or instructing the vehicle to avoid contact with the target object by steering, performs a first preliminary operation when the degree of approach satisfies a second condition, performs a second preliminary operation when the degree of approach satisfies a third condition and it is determined that there is no space in which the vehicle can proceed after performing avoidance steering in any of travel paths to sides of the target object at a time when the third condition is satisfied, and changes a control mode of the braking control when a situation where the first preliminary operation or the second preliminary operation that is being executed becomes unable to continue has occurred.

10 Claims, 8 Drawing Sheets

(51) Int. Cl.

| | |
|---|---|
| ***B60W 10/20*** | (2006.01) |
| ***B60W 30/095*** | (2012.01) |
| ***B60W 50/14*** | (2020.01) |

(52) U.S. Cl.

CPC .... *B60W 30/0953* (2013.01); *B60W 30/0956* (2013.01); *B60W 50/14* (2013.01); *B60W 2050/146* (2013.01); *B60W 2554/4041* (2020.02)

(56) References Cited

U.S. PATENT DOCUMENTS

| | | | | |
|---|---|---|---|---|
| 8,423,254 | B2 * | 4/2013 | Tanimichi | G08G 1/163 701/70 |
| 10,569,771 | B2 * | 2/2020 | Song | G02B 7/02 |
| 10,730,503 | B2 * | 8/2020 | Okada | G05D 1/0246 |
| 10,829,128 | B2 * | 11/2020 | Hoshikawa | B60W 30/09 |
| 10,843,688 | B2 * | 11/2020 | Taki | B60W 30/09 |
| 11,124,164 | B2 * | 9/2021 | Kim | B60T 7/22 |
| 11,738,724 | B2 * | 8/2023 | Meng | G08G 1/166 701/70 |
| 11,760,321 | B2 * | 9/2023 | Kim | B60T 7/22 701/70 |
| 12,246,735 | B2 * | 3/2025 | Yamada | B60W 30/09 |
| 12,391,239 | B2 * | 8/2025 | Oka | B60W 10/20 |
| 12,454,262 | B2 * | 10/2025 | Oka | B60W 10/20 |
| 2011/0166746 | A1 * | 7/2011 | Breuer | B60T 17/221 701/29.2 |
| 2018/0229722 | A1 * | 8/2018 | Taki | B60T 7/22 |
| 2019/0092343 | A1 * | 3/2019 | Hoshikawa | B60W 30/09 |
| 2019/0143968 | A1 * | 5/2019 | Song | G02B 7/02 |
| 2019/0217829 | A1 * | 7/2019 | Kim | B60T 7/22 |
| 2021/0179123 | A1 * | 6/2021 | Yamada | B60W 50/035 |
| 2022/0097661 | A1 * | 3/2022 | Meng | G06V 20/58 |
| 2022/0111823 | A1 * | 4/2022 | Kim | B60T 7/22 |
| 2022/0144277 | A1 * | 5/2022 | Hiramatsu | B60W 30/143 |
| 2023/0159028 | A1 * | 5/2023 | Fukui | B60W 30/0956 701/301 |
| 2023/0294673 | A1 * | 9/2023 | Oka | B60W 50/16 701/301 |
| 2023/0294674 | A1 * | 9/2023 | Oka | B60W 30/0956 701/301 |
| 2023/0294675 | A1 * | 9/2023 | Oka | B60W 30/0956 701/301 |
| 2023/0294676 | A1 * | 9/2023 | Oka | B60W 30/08 701/26 |
| 2023/0294677 | A1 * | 9/2023 | Oka | B60W 60/001 701/23 |
| 2023/0294678 | A1 * | 9/2023 | Oka | B60W 30/09 701/26 |
| 2023/0294679 | A1 * | 9/2023 | Oka | B60W 50/16 701/26 |
| 2023/0294680 | A1 * | 9/2023 | Oka | B60W 30/085 701/301 |
| 2023/0294681 | A1 * | 9/2023 | Oka | B60W 10/20 701/26 |
| 2023/0311918 | A1 * | 10/2023 | Yasui | B60K 35/28 340/425.5 |
| 2025/0108783 | A1 * | 4/2025 | Oniwa | B60T 7/22 |
| 2025/0108793 | A1 * | 4/2025 | Oniwa | B60W 30/09 |
| 2025/0108794 | A1 * | 4/2025 | Oniwa | B60W 30/09 |
| 2025/0108795 | A1 * | 4/2025 | Oniwa | B60W 30/0956 |
| 2025/0108799 | A1 * | 4/2025 | Oniwa | B60W 30/12 |
| 2025/0108800 | A1 * | 4/2025 | Oniwa | B60W 30/14 |
| 2025/0108862 | A1 * | 4/2025 | Oniwa | B60W 40/109 |
| 2025/0178598 | A1 * | 6/2025 | Oka | B60W 10/184 |
| 2025/0178599 | A1 * | 6/2025 | Kaneda | B60W 30/09 |
| 2025/0196849 | A1 * | 6/2025 | Nakatsuka | B60W 30/0956 |
| 2025/0196850 | A1 * | 6/2025 | Ishikawa | B60W 10/20 |
| 2025/0206293 | A1 * | 6/2025 | Ishikawa | B60W 30/0956 |
| 2025/0206374 | A1 * | 6/2025 | Miyamoto | B62D 15/0265 |

FOREIGN PATENT DOCUMENTS

| | | | | | |
|---|---|---|---|---|---|
| CN | 113879292 | A | * | 1/2022 | B60W 30/0953 |
| CN | 116161021 | A | * | 5/2023 | B60W 30/0956 |
| CN | 118418999 | A | * | 8/2024 | B60W 60/0017 |
| CN | 119095755 | A | * | 12/2024 | B60W 30/18163 |
| CN | 119408565 | A | * | 2/2025 | B60W 40/10 |
| DE | 19856823 | A1 | * | 6/1999 | B60T 7/22 |
| DE | 19856823 | B4 | * | 7/2006 | B60T 7/22 |
| EP | 3470285 | A2 | * | 4/2019 | B60W 30/08 |
| EP | 3470285 | B1 | * | 2/2023 | B60W 50/12 |
| JP | H11175898 | A | * | 7/1999 | B60T 8/172 |
| JP | 3330313 | B2 | * | 9/2002 | B60T 7/22 |
| JP | 2004017925 | A | * | 1/2004 | |
| JP | 2004090869 | A | * | 3/2004 | |
| JP | 2019059252 | A | * | 4/2019 | B60W 30/08 |
| JP | 2020-050010 | | | 4/2020 | |
| JP | 2020050010 | A | * | 4/2020 | |
| JP | 2021-009624 | | | 1/2021 | |
| JP | 2021009624 | A | * | 1/2021 | B60W 30/09 |
| JP | 6939322 | B2 | * | 9/2021 | B60W 30/09 |
| JP | 2023137233 | A | * | 9/2023 | |
| JP | 2023137480 | A | * | 9/2023 | |
| JP | 2023137956 | A | * | 9/2023 | |
| JP | 2023137966 | A | * | 9/2023 | |
| JP | 2025059136 | A | * | 4/2025 | B60W 10/20 |
| JP | 2025059552 | A | * | 4/2025 | B60W 30/0956 |
| JP | 7712808 | B2 | * | 7/2025 | B60T 8/171 |
| WO | WO-2014068668 | A1 | * | 5/2014 | B60T 7/22 |
| WO | 2020/201797 | | | 10/2020 | |
| WO | WO-2020201797 | A1 | * | 10/2020 | B60R 21/00 |
| WO | WO-2023175917 | A1 | * | 9/2023 | G08G 1/163 |

* cited by examiner

X
Y
Z
L1
L2
L3
M
$D_M$
TO
POINT WHERE
TTC < Th1
POINT WHERE
TTC < Th2
POINT WHERE
TTC < Th3

FIG. 3

Z
X
Y
L1
L2
L3
TO
ET
A2L
A2R
M
POINT WHERE TTC < Th1
POINT WHERE TTC < Th2
POINT WHERE TTC < Th3

Z
X
Y
L1
L2
L3
M
$D_M$
TO
A1L
A1R
POINT WHERE TTC < Th1
POINT WHERE TTC < Th2
POINT WHERE TTC < Th3
DECELERATION INCLUDING FIRST PRELIMINARY OPERATION
B1
B2
0
DECELERATION INCLUDING SECOND PRELIMINARY OPERATION
B1
B4
B3
0

Z
X
Y
A1L
TO
L1
M
$D_M$
L2
L3
A1R
POINT WHERE TTC < Th3
POINT WHERE TTC < Th2
POINT WHERE TTC < Th1#
POINT WHERE TTC < Th1
DECELERATION INCLUDING FIRST PRELIMINARY OPERATION
B1
B2
0
DECELERATION INCLUDING SECOND PRELIMINARY OPERATION
B1
B4
B3
0

Z
X
Y
A1L
TO
L1
M
$D_M$
L2
L3
A1R
POINT WHERE TTC < Th3
POINT WHERE TTC < Th2
POINT WHERE TTC < Th1
B1#
B1
B2
0
DECELERATION INCLUDING FIRST PRELIMINARY OPERATION
B1#
B1
B4
B3
0
DECELERATION INCLUDING SECOND PRELIMINARY OPERATION

DRIVING ASSISTANCE DEVICE, DRIVING ASSISTANCE METHOD, AND STORAGE MEDIUM

TECHNICAL FIELD

The present invention relates to a driving assistance device, a driving assistance method, and a non-transitory computer-readable storage medium.

BACKGROUND ART

Inventions of vehicle control devices that perform automatic deceleration control and automatic steering control have been disclosed in recent years (for example, see Patent Document 1).

CITATION LIST

Patent Document

[Patent Document 1]

Japanese Unexamined Patent Application, First Publication No. 2020-50010

SUMMARY OF INVENTION

Technical Problem

A vehicle that can perform automatic steering control in addition to automatic deceleration control is highly likely to be able to quickly cope with sudden changes in the situation of the vehicle and has a relatively high margin of control. On the other hand, if there is no avoidance space to the side of a target object, the margin of control is the same as that of a vehicle that only performs automatic deceleration control because automatic steering control is difficult. With the technology of the related art, it may not be possible to perform operations in accordance with such differences in situations of the vehicle.

The present invention has been made in consideration of such circumstances and it is an object of the present invention to provide a driving assistance device, a driving assistance method, and a program that can provide more appropriate driving assistance depending on situations of a vehicle.

Solution to Problem

A driving assistance device, a driving assistance method, and a program according to the present invention adopt the following configurations.

(1) A driving assistance device according to an aspect of the present invention includes a braking controller configured to refer to an output of a detection device configured to detect presence of objects in front of a vehicle, and when a degree of approach between the vehicle and a target object among the objects satisfies a first condition, perform braking control to instruct a brake device of the vehicle to stop the vehicle and an avoidance steering controller configured to instruct a steering device of the vehicle to avoid contact with the target object by steering, wherein the braking controller includes a first preliminary operation controller configured to perform a first preliminary operation when the degree of approach satisfies a second condition and further includes a second preliminary operation controller configured to perform a second preliminary operation when the degree of approach satisfies a third condition and it is determined that there is no space in which the vehicle can proceed after performing avoidance steering in any of travel paths to sides of the target object at a time when the third condition is satisfied, the first condition is a condition that is satisfied when the degree of approach is higher than the second condition, the second condition is a condition that is satisfied when the degree of approach is higher than the third condition, and the braking controller is configured to change a control mode of the braking control when a situation where the first preliminary operation or the second preliminary operation that is being executed becomes unable to continue has occurred.

(2) In the above aspect (1), wherein the situation where the first preliminary operation or the second preliminary operation that is being executed becomes unable to continue includes a situation where performance of the detection device degrades.

(3) In the above aspect (1) or (2), the braking controller is configured to change the first condition such that control for stopping the vehicle is more easily performed when the first preliminary operation or the second preliminary operation that is being executed becomes unable to continue.

(4) In the above aspect (3), the braking controller is configured to, when the first preliminary operation or the second preliminary operation that is being executed becomes unable to continue, change the first condition such that control for stopping the vehicle is performed at an earlier time than when the first preliminary operation or the second preliminary operation is able to continue.

(5) In any one of the above aspects (1) to (4), the braking controller is configured to, when the first preliminary operation or the second preliminary operation that is being executed becomes unable to continue and control for stopping the vehicle is performed, instruct the brake device of the vehicle to output a greater braking force than when the first preliminary operation or the second preliminary operation is able to continue.

(6) In any one of the above aspects (1) to (5), the second preliminary operation is an operation that starts at an earlier time than the first preliminary operation.

(7) In any one of the above aspects (1) to (6), at least one of the first preliminary operation and the second preliminary operation is an operation of instructing the brake device to output a braking force smaller than a braking force that the braking controller instructs the brake device to output.

(8) In any one of the above aspects (1) to (7), the braking controller is configured to instruct an output device to perform an image display, an audio output, or a vibration output indicating that the control mode of the braking control is to be changed.

(9) A driving assistance method according to an aspect of the present invention includes, by a computer, performing either or both of referring to an output of a detection device configured to detect presence of objects in front of a vehicle, and when a degree of approach between the vehicle and a target object among the objects satisfies a first condition, performing braking control to instruct a brake device of the vehicle to stop the vehicle or instructing a steering device of the vehicle to avoid contact with the target object by steering, performing a first preliminary operation when the degree of approach between the target object and the vehicle satisfies a second condition, performing a second preliminary operation when the degree of approach between the target object and the vehicle satisfies a third condition and it is determined that there is no space in which the vehicle can proceed after performing avoidance steering in any of travel paths to sides of the target object at a time when the third condition is satisfied, the first condition being a condition that is satisfied when the degree of approach is higher than the second condition, the second condition being a condition that is satisfied when the degree of approach is higher than the third condition, and changing a control mode of the braking control when a situation where the first preliminary operation or the second preliminary operation that is being executed becomes unable to continue has occurred.

(10) A program according to an aspect of the present invention causes a computer to perform either or both of referring to an output of a detection device configured to detect presence of objects in front of a vehicle, and when a degree of approach between the vehicle and a target object among the objects satisfies a first condition, performing braking control to instruct a brake device of the vehicle to stop the vehicle or instructing a steering device of the vehicle to avoid contact with the target object by steering, perform a first preliminary operation when the degree of approach between the target object and the vehicle satisfies a second condition, perform a second preliminary operation when the degree of approach between the target object and the vehicle satisfies a third condition and it is determined that there is no space in which the vehicle can proceed after performing avoidance steering in any of travel paths to sides of the target object at a time when the third condition is satisfied, the first condition being a condition that is satisfied when the degree of approach is higher than the second condition, the second condition being a condition that is satisfied when the degree of approach is higher than the third condition, and change a control mode of the braking control when a situation where the first preliminary operation or the second preliminary operation that is being executed becomes unable to continue has occurred.

Advantageous Effects of Invention

According to the aspects (1) to (10) above, more appropriate driving assistance can be provided depending on the situation of the vehicle.

BRIEF DESCRIPTION OF DRAWINGS

FIG. 3 is a diagram showing an example of an operation scene of an avoidance steering controller.

DESCRIPTION OF EMBODIMENTS

Hereinafter, embodiments of a driving assistance device, a driving assistance method, and a program of the present invention will be described with reference to the drawings.

Overall Configuration

Figure 1:
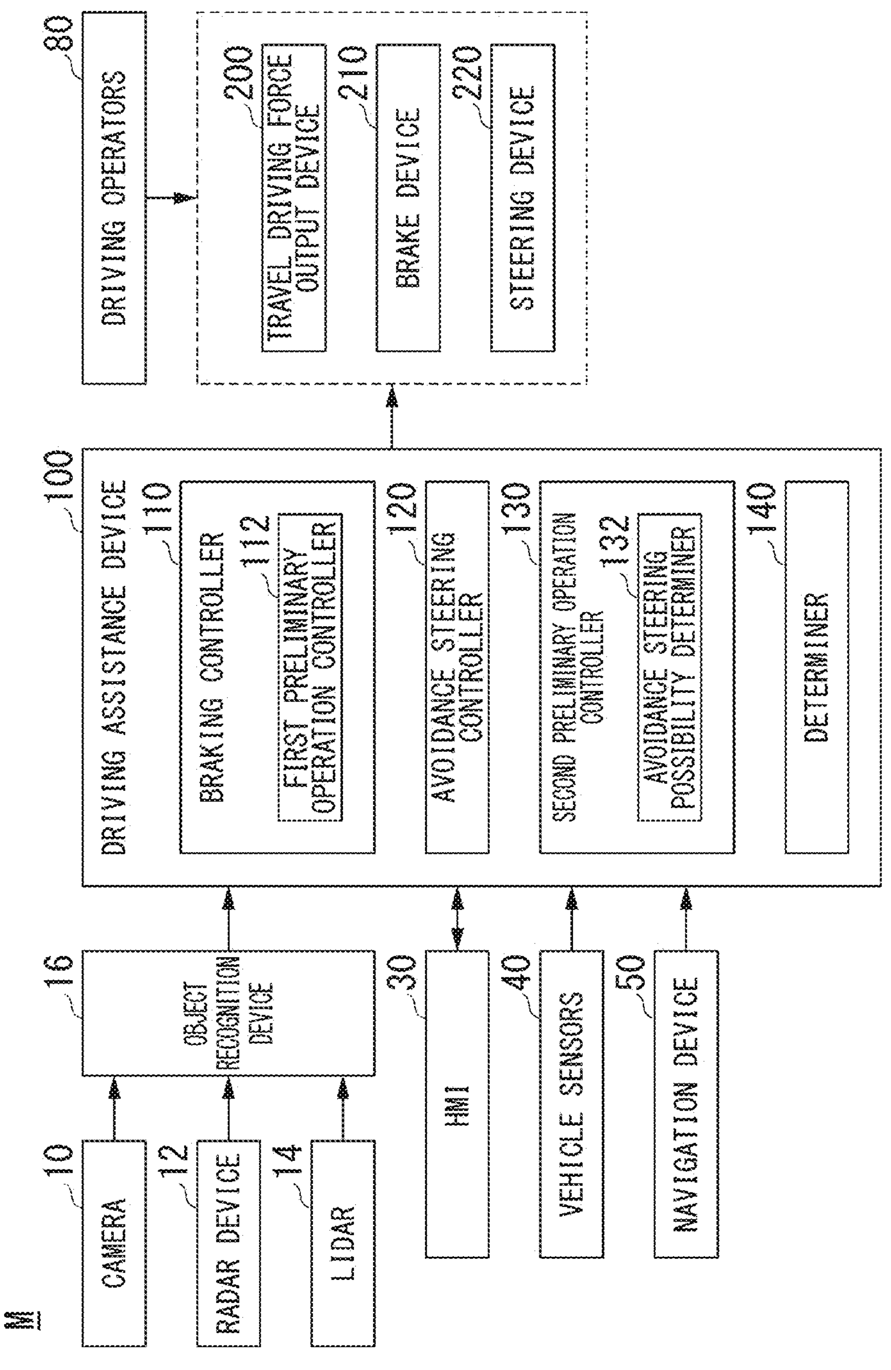
FIG. 1 is a configuration diagram of a vehicle in which a driving assistance device according to an embodiment is mounted.

FIG. 1 is a configuration diagram of a vehicle M in which a driving assistance device 100 of an embodiment is mounted. The vehicle M is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle M includes, for example, a camera 10, a radar device 12, a light detection and ranging (LIDAR) device 14, an object recognition device 16, a human machine interface (HMI) 30, vehicle sensors 40, driving operators 80, the driving assistance device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added. The HMI 30 is an example of an "output device." The brake device 210 is an example of a "brake device." The steering device 220 is an example of a "steering device."

The camera 10 is, for example, a digital camera using a solid-state imaging device such as a charge coupled device (CCD) or a complementary metal oxide semiconductor (CMOS). The camera 10 is attached to a vehicle in which a vehicle system 1 is mounted (hereinafter referred to as the vehicle M) at an arbitrary location. For imaging the area in front of the vehicle M, the camera 10 is attached to an upper portion of a front windshield, a rear surface of a rearview mirror, or the like. For example, the camera 10 repeats imaging of the surroundings of the vehicle M at regular intervals. The camera 10 may also be a stereo camera.

The radar device 12 radiates radio waves such as millimeter waves around the vehicle M and detects radio waves reflected by an object (reflected waves) to detect at least the position (distance and orientation) of the object. The radar device 12 is attached to the vehicle M at an arbitrary location. The radar device 12 may detect the position and speed of an object using a frequency modulated continuous wave (FM-CW) method.

The LIDAR device 14 illuminates the surroundings of the vehicle M with light (or electromagnetic waves with a wavelength close to light) and measures scattered light. The LIDAR device 14 detects the distance to a target based on a period of time from when light is emitted to when light is received. The radiated light is, for example, pulsed laser light. The LIDAR device 14 is attached to the vehicle M at an arbitrary location.

The object recognition device 16 performs a sensor fusion process on results of detection by some or all of the camera 10, the radar device 12, and the LIDAR device 14 to recognize the position, type, speed, or the like of the object. The object recognition device 16 outputs the recognition result to the driving assistance device 100. The object recognition device 16 may output detection results of the camera 10, the radar device 12, and the LIDAR device 14 to the driving assistance device 100 as they are. The object recognition device 16 may be omitted from the vehicle system 1. Some or all of the camera 10, the radar device 12, the LIDAR device 14, and the object recognition device 16 are examples of "detection devices."

The object recognition device 16 may acquire the reliability (an index value indicating certainty) of the recognized object. In this case, for example, the object recognition device 16 refers to feature information (for example, an outline, a shape, a size, or a color) obtained by analyzing an image captured by the camera 10 (hereinafter referred to as a camera image), a predefined model for pattern matching, and the like and acquires the reliability of an object included in the image through matching processing. The model is, for example, but not limited to, a trained model such as a deep neural network (DNN) that has been trained to receive feature information which is an analysis result and output the type, reliability, and the like of an object. The model may be stored, for example, in a storage unit (not shown) of the object recognition device 16 or may be acquired from an external device via a communication device (not shown) mounted in the vehicle M. The model may also be updated as appropriate using feedback control with recognition results, update data from an external device, or the like.

The HMI 30 presents various types of information to an occupant of the vehicle M and receives an input operation from the occupant. The HMI 30 includes various display devices, a speaker, a buzzer, a vibration generator (a vibrator), a touch panel, switches, keys, and the like.

The vehicle sensors 40 include a vehicle speed sensor that detects the speed of the vehicle M, an acceleration sensor that detects the acceleration thereof, a yaw rate sensor that detects an angular speed thereof about the vertical axis, an orientation sensor that detects the orientation of the vehicle M, or the like.

The navigation device 50 includes, for example, a global navigation satellite system (GNSS) receiver, a guidance controller, and a storage unit that stores map information. The GNSS receiver identifies the position of the vehicle M based on signals received from GNSS satellites. The position of the vehicle M may also be identified or supplemented by an inertial navigation system (INS) using the output of the vehicle sensors 40. For example, the guidance controller determines a route from the position of the vehicle M identified by the GNSS receiver (or an arbitrary input position) to a destination input by the occupant by referring to the map information and causes the HMI 30 to output guidance information such that the vehicle M travels along the route. The map information is, for example, information representing shapes of roads by links indicating roads and nodes connected by the links. The map information may include the number of lanes and curvature of each road, point of interest (POI) information, information on road lane lines (such as, for example, shape, line type, and color), and the like. The navigation device 50 may also transmit the current position and the destination of the vehicle M to a navigation server via the communication device and acquire a route from the navigation server.

The driving operators 80 include, for example, an accelerator pedal, a brake pedal, a steering wheel, a shift lever, and other operators. Sensors for detecting the amounts of operation or the presence or absence of operation are attached to the driving operators 80. Results of the detection are output to some or all of the travel driving force output device 200, the brake device 210, and the steering device 220.

The travel driving force output device 200 outputs a travel driving force (torque) required for the vehicle to travel to steered wheels. The travel driving force output device 200 includes, for example, a combination of an internal combustion engine, an electric motor, a transmission, and the like and an electronic controller (ECU) that controls these. The ECU controls these components according to information input from the driving assistance device 100 or information input from the driving operators 80.

The brake device 210 includes, for example, a brake caliper, a cylinder that transmits hydraulic pressure to the brake caliper, an electric motor that generates hydraulic pressure in the cylinder, and an ECU. The ECU controls the electric motor according to information input from the driving assistance device 100 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not necessarily configured as described above and may be an electronically controlled hydraulic brake device that controls an actuator according to information input from the driving assistance device 100 and transmits the hydraulic pressure of the master cylinder to the cylinder.

The steering device 220 includes, for example, a steering ECU and an electric motor. The electric motor, for example, applies a force to a rack-and-pinion mechanism to change the direction of steered wheels. The steering ECU drives the electric motor according to information input from the driving assistance device 100 or information input from the driving operators 80 to change the direction of the steered wheels.

Driving Assistance Device

The driving assistance device 100 includes, for example, a braking controller 110, an avoidance steering controller 120, a second preliminary operation controller 130, and a determiner 140. The braking controller 110 includes a first preliminary operation controller 112 and the second preliminary operation controller 130 includes an avoidance steering possibility determiner 132. Each of these functional components is realized, for example, by a hardware processor such as a central processing unit (CPU) executing a program (software). Some or all of these components may be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in advance in a storage device such as an HDD or a flash memory (a storage device having a non-transitory storage medium) of the driving assistance device 100 or may be stored in a detachable storage medium such as a DVD or a CD-ROM and then installed in the HDD or flash memory of the driving assistance device 100 by mounting the storage medium (the non-transitory storage medium) in a drive device.

The travel driving force output device 200, the brake device 210, and the steering device 220 are internally set such that instructions to the travel driving force output device 200, the brake device 210, and the steering device 220 from the driving assistance device 100 are executed with priority over the detection results from the driving operator 80. Regarding braking, an instruction from the driving assistance device 100 may be set to be executed with priority when a braking force based on the amount of operation of the brake pedal is greater than the instruction from the driving assistance device 100. Communication priority in an in-vehicle local area network (LAN) may be used as a scheme for executing instructions from the driving assistance device 100 with priority.

Figure 2:
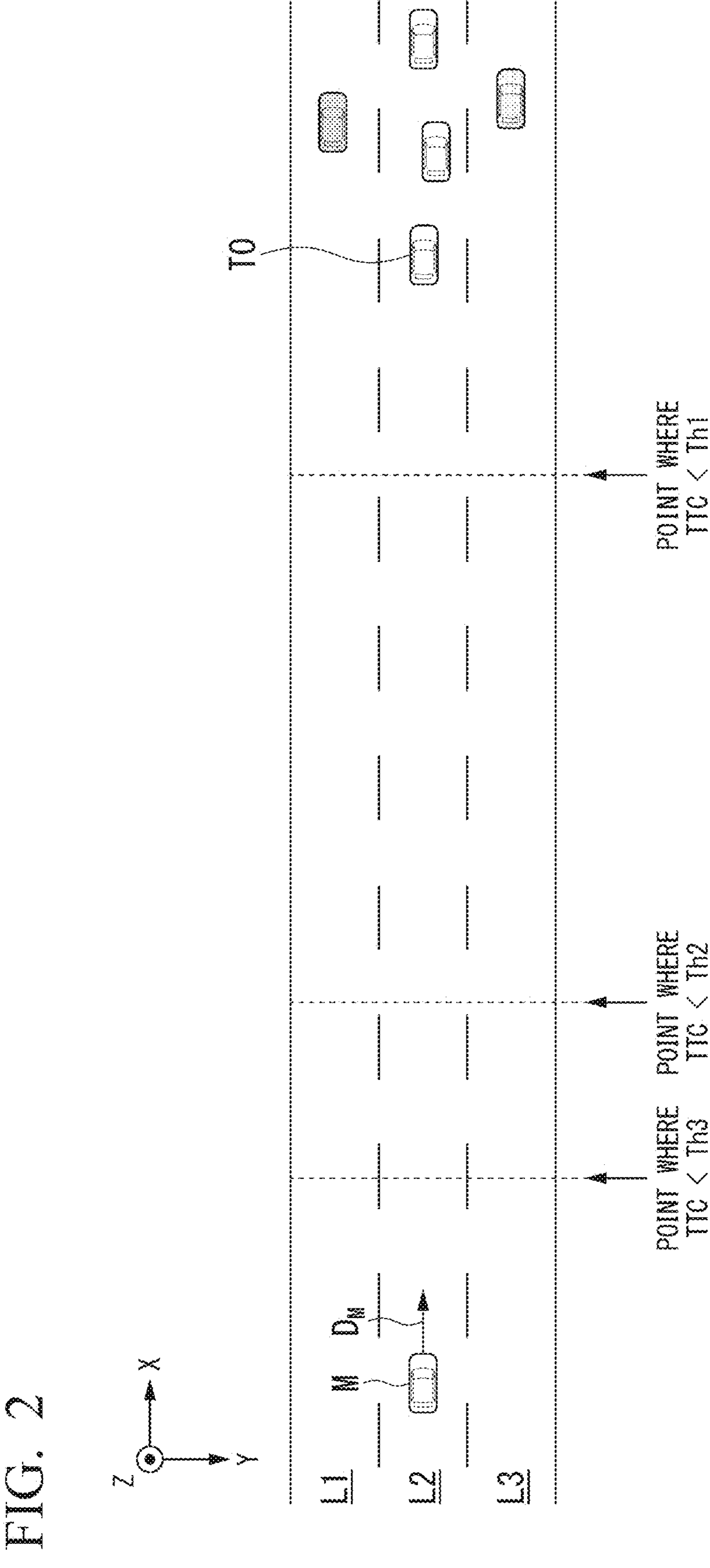
FIG. 2 is a diagram showing an overview of functions of the driving assistance device.

FIG. 2 is a diagram showing an overview of the functions of the driving assistance device 100. Hereinafter, each component of the driving assistance device 100 will be described with reference to FIGS. 1 and 2. In FIG. 2, a vehicle Mis traveling on a three-lane road extending in an X-axis direction in FIG. 2 and is in lane L2 in the center. DM is a travel direction of the vehicle M. A Y-axis direction in FIG. 2 is a road width (lane width) direction. A Z-axis direction in FIG. 2 is a vertical direction with respect to the vehicle M or a road surface (a horizontal surface). In the following description, an XYZ coordinate system may be used as necessary.

The braking controller 110 refers to an output of a detection device (described above) that detects the presence of objects in front of the vehicle M, and when the degree of approach between the vehicle M and a target object TO among the objects satisfies a first condition, performs braking control to instruct at least the brake device 210 out of the brake device 210 and the travel driving force output device 200 to decelerate and stop the vehicle M. The target object TO is an object that is in the same travel path as the vehicle M and in front of the vehicle M in the travel direction of the vehicle M and is an object that the vehicle M is to avoid contact with, excluding objects that can be driven over such as manholes. The braking controller 110 extracts such an object and sets it as the target object TO. In the example of FIG. 2, another vehicle at the end of a plurality of vehicles that are in front of the vehicle M and are traveling in the same lane L2 as the vehicle M (another vehicle closest to the vehicle M) is set as the target object TO. The travel path is, for example, a lane. Lanes are defined, for example, by lane lines (for example, road lane lines) recognized by a detection device or the like. Lanes may be virtual lanes that the vehicle M virtually set on a road surface where there are no road lane lines. The same applies to the following description.

The "degree of approach" is expressed by various index values indicating the degree of approach between objects. For example, the "degree of approach" is a time to collision (TTC) which is an index value obtained by dividing the distance by the relative speed (which is positive when objects approach each other). When the relative speed is negative (when objects are moving away from each other), the TTC is temporarily set to infinity. The TTC is an index value indicating that the smaller its value, the higher the "degree of approach." Satisfying the "first condition" means, for example, that the TTC is less than the first threshold Th1. The first threshold Th1 is, for example, a value of about several seconds. Instead of the TTC, an index value having similar properties such as, for example, headway time, distance, or other index values may be used as the "degree of approach." The TTC adjusted by taking into account acceleration and jerk may also be used as the "degree of approach." In the following description, it is assumed that the "degree of approach" is a TTC.

When the first condition is satisfied (the TTC is less than the first threshold Th1), the braking controller 110 instructs, for example, the brake device 210 and/or the travel driving force output device 200 to output a braking force that decelerates the vehicle M at a first deceleration B1. The first deceleration B1 is, for example, a deceleration of about several tenths of 1 G (close to 1). Thereby, the braking controller 110 quickly decelerates and stops the vehicle M, avoiding contact with the target object TO. The ECU of the brake device 210 or the travel driving force output device 200 has the function of obtaining the brake output, a regeneration control amount, an engine brake amount and the like from the instructed deceleration and determines each control amount based on the instructed deceleration and the speed of the vehicle M. This is a known technique and detailed description will be omitted.

The braking controller 110 changes the control mode of the braking control for stopping the vehicle M, for example, when a situation where the first preliminary operation or the second preliminary operation that is being executed cannot be continued has occurred during execution of the first preliminary operation or the second preliminary operation. Details of the function of the braking controller 110 described above will be described later. The operation of the first preliminary operation controller 112 will be described later and the avoidance steering controller 120 will be described first.

Figure 3:
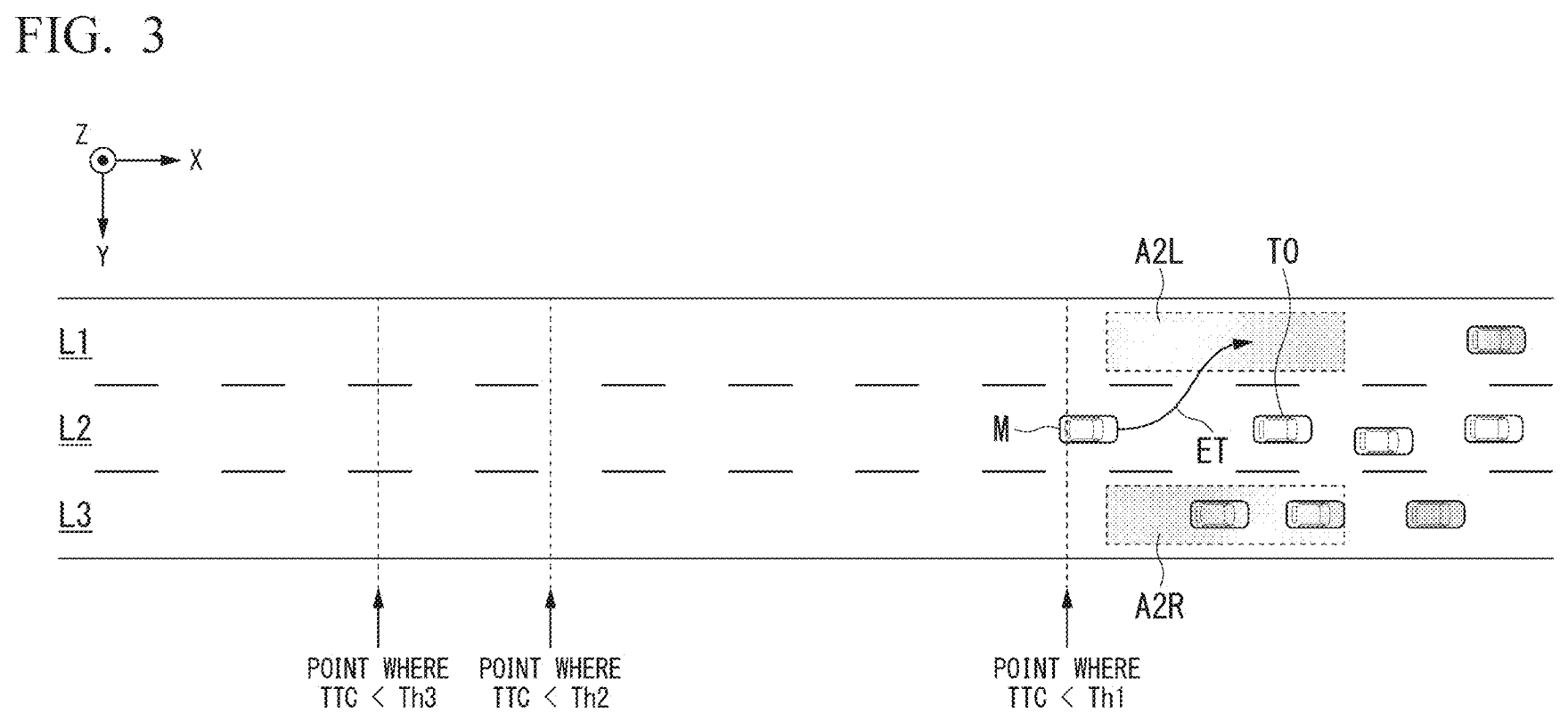

FIG. 3 is a diagram showing an example of an operation scene of the avoidance steering controller 120. When it is determined that it is difficult for the braking controller 110 to stop the vehicle M before the target object TO, the avoidance steering controller 120 determines whether there is a space in which the vehicle M can proceed in travel paths to the sides of the target object TO (for example, the lanes L1 and L3), and upon determining that there is a space, generates an avoidance trajectory ET and instructs the steering device 220 to cause the vehicle M to proceed along the avoidance trajectory ET (avoidance steering). For example, the avoidance steering controller 120 determines whether there is an object in a side area extending from slightly in front of the target object TO to behind the target object TO on either side of the target object TO such as an area A2L or A2R shown in FIG. 3, and when it is determined that there are no objects, determines that there is a space in which the vehicle M can proceed in a travel path to the side of the target object TO. Whether it is difficult for the braking controller 110 to stop the vehicle M before the target object TO may be determined by the braking controller 110 or may be determined by the avoidance steering controller 120. The avoidance steering controller 120 may recognize lane lines defining lanes such as white lines and road shoulders in camera images to recognize the boundaries of the travel path, and when either the travelable area A2L or A2R is absent in the first place, for example, when either the lane L1 or L3 is absent, determine that an object is present in that area.

Avoidance steering is performed in a situation where a sudden change in the surrounding environment of the vehicle occurs such as, for example, when the target object TO decelerates unexpectedly or when an object other than the recognized target object TO intervenes between the vehicle M and the target object TO and is set as a new target object TO. The deceleration calculated in advance to stop the vehicle M before the target object TO may not be able to cope with such a situation, but having an avoidance steering function can increase the probability that the vehicle M can cope with sudden changes in the surrounding environment.

Preliminary Operations

Figure 4:
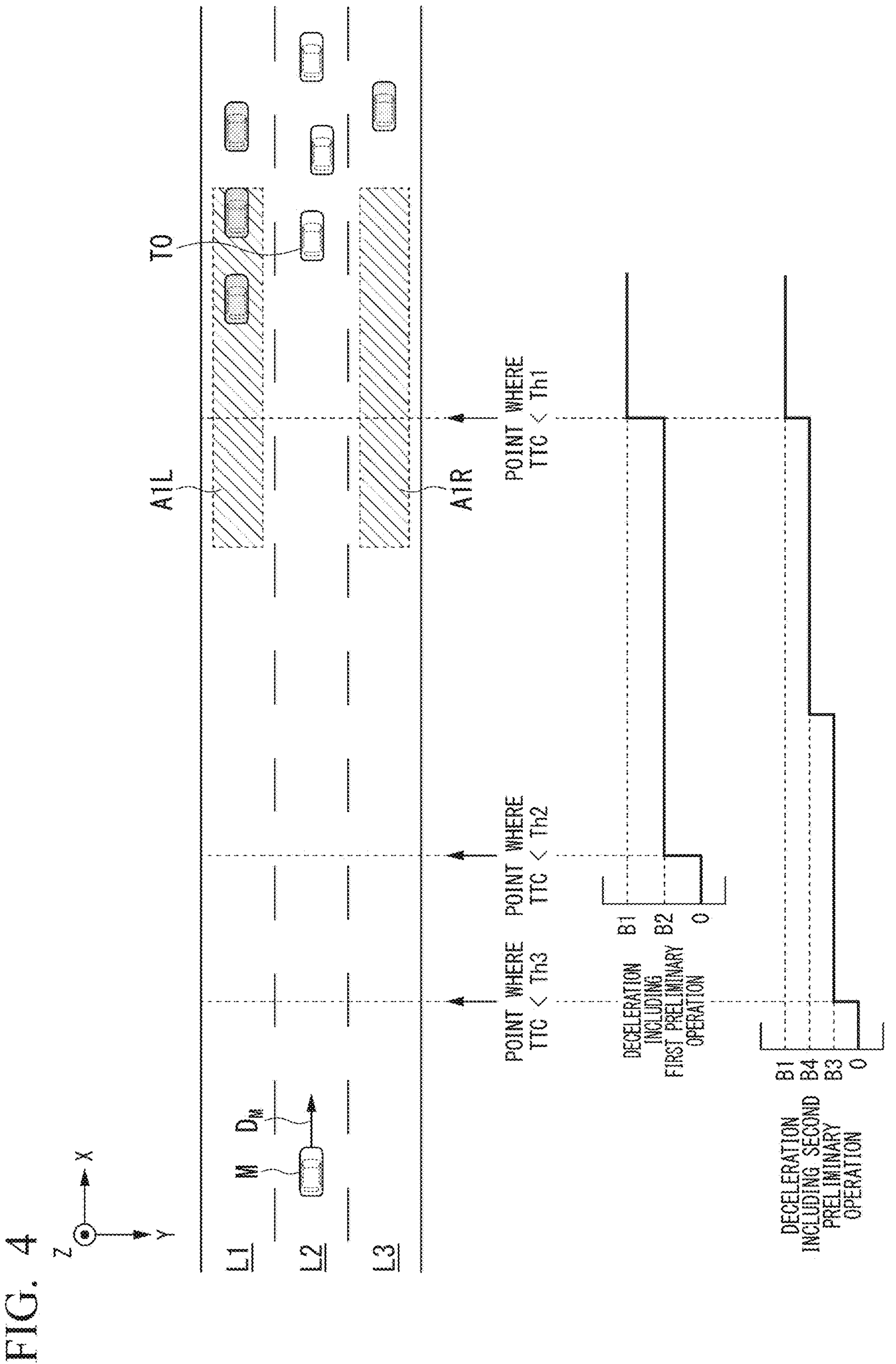
FIG. 4 is a diagram for explaining preliminary operations.

Hereinafter, the processing of the first preliminary operation controller 112 and the second preliminary operation controller 130 will be described. FIG. 4 is a diagram for explaining preliminary operations.

The first preliminary operation controller 112 performs a first preliminary operation to notify the driver of the vehicle M of the presence of the target object TO when the degree of approach between the target object TO and the vehicle M satisfies a second condition (for example, when the TTC is less than a second threshold Th2). The first preliminary operation is, for example, an operation instructing the brake device 210 and/or the travel driving force output device 200 to output a braking force that decelerates the vehicle M at a second deceleration B2 from when the TTC becomes less than the second threshold Th2 until it becomes less than the first threshold Th1. The second deceleration B2 is a deceleration smaller (closer to zero) than the first deceleration B1. The second threshold Th2 is a value greater than the first threshold Th1. Thus, the first condition is a condition that is satisfied when the degree of approach is higher than the second condition.

The second preliminary operation controller 130 performs a second preliminary operation for notifying the driver of the vehicle M of the presence of the target object TO when the degree of approach between the target object TO and the vehicle M satisfies a third condition (for example, the TTC is less than a third threshold Th3) and it is determined that there is no space in which the vehicle M can proceed after performing avoidance steering in any of the travel paths to the sides of the target object TO at the time when the third condition is satisfied. The determination regarding the space in which the vehicle can proceed is performed by the avoidance steering possibility determiner 132. The third threshold Th3 is a value greater than the second threshold Th2. Thus, the second condition is a condition that is satisfied when the degree of approach is higher than the third condition.

For example, when the TTC becomes less than the third threshold Th3, the avoidance steering possibility determiner 132 determines whether there is an object in a side area extending from slightly in front of the target object TO to behind the target object TO on either side of the target object TO such as an area A1L or AR shown in FIG. 4, and when there are no objects, determines that there is a space in which the vehicle M can proceed in a travel path to the side of the target object TO. Each of the areas A1L and A1R is set to be greater than each of the areas A2L and A2R, for example, in consideration of future uncertain factors. Similar to the avoidance steering controller 120, the avoidance steering possibility determiner 132 may recognize lane lines such as white lines and road shoulders in camera images to recognize the boundaries of the travel path, and when either the travelable area A1L or A1R is absent in the first place, for example, when either the lane L1 or L3 is absent, determine that an object is present in that area. In the example of FIG. 4, the avoidance steering possibility determiner 132 determines that there is a space in which the vehicle M can proceed in a travel path to the side of the target object TO because there is no object in the area A1R.

The second preliminary operation is, for example, an operation that first instructs the brake device 210 and/or the travel driving force output device 200 to output a braking force that decelerates the vehicle M at a third deceleration B3 and then instructs the brake device 210 and/or the travel driving force output device 200 to output a braking force that decelerates the vehicle M at a fourth deceleration B4 from when the TTC becomes less than the third threshold Th3 until it becomes less than the first threshold Th1. The third deceleration B3 is, for example, a deceleration smaller than the second deceleration B2 (close to zero) and the fourth deceleration B4 is a deceleration greater than or about the same as the second deceleration and less than the first deceleration B1. The time when switching is made from the third deceleration B3 to the fourth deceleration B4 may be set arbitrarily.

In this way, the second preliminary operation is started at an earlier time than the first preliminary operation and is performed in multiple stages. In a situation where avoidance steering is possible, there is a high probability of being able to quickly cope with sudden changes in the surrounding environment of the vehicle and the margin of control is relatively high as described above. On the other hand, if there is no avoidance space to the side of the target object, the margin of control of the vehicle will be the same as that of a vehicle that can only automatically stop because it will be difficult to perform avoidance steering despite having the avoidance steering function. That is, in a situation where avoidance steering is difficult, it is preferable to alert the driver of the vehicle M more quickly and effectively than in a situation where avoidance steering is possible. According to the present embodiment, the second preliminary operation is started at an earlier time than the first preliminary operation and is performed in multiple stages, thereby making it possible to perform an appropriate preliminary operation according to the surrounding situation of the target object.

The determiner 140 determines whether a situation where the first preliminary operation or the second preliminary operation that is being executed cannot be continued has occurred during execution of the first preliminary operation or the second preliminary operation. The determination result of the determiner 140 is output to the braking controller 110 and the second preliminary operation controller 130. Details of the function of the determiner 140 will be described later.

Figure 5:
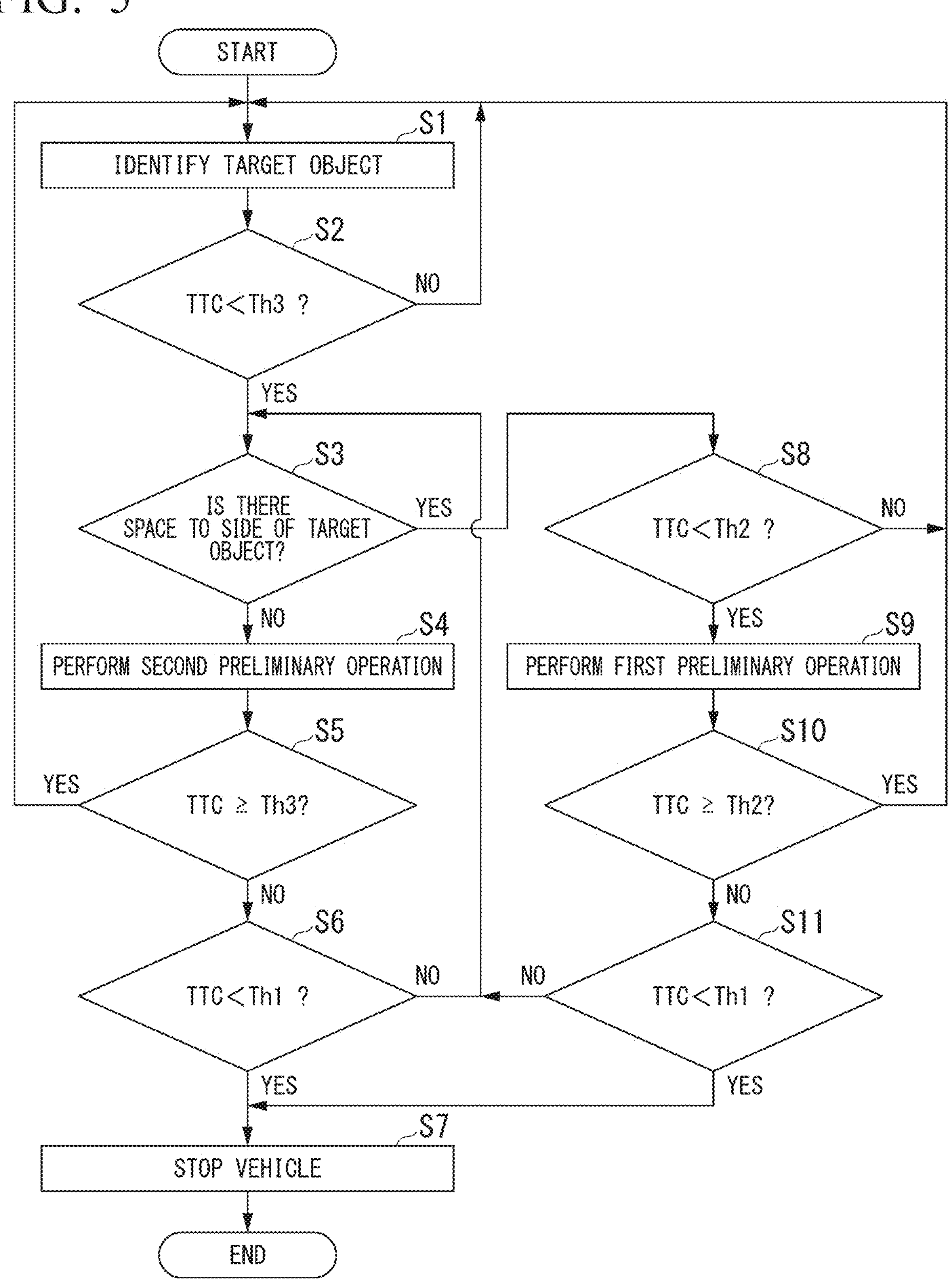
FIG. 5 is a flowchart showing an example of a flow of a process performed by the driving assistance device.

FIG. 5 is a flowchart showing an example of a flow of a process performed by the driving assistance device 100.

First, the braking controller 110 identifies a target object TO (step S1). Next, the second preliminary operation controller 130 determines whether the TTC between the vehicle M and the target object TO is less than the third threshold Th3 (step S2). When the TTC between the vehicle M and the target object TO is greater than or equal to the third threshold Th3, the process returns to step S1.

When it is determined that the TTC between the vehicle M and the target object TO is less than the third threshold Th3, the avoidance steering possibility determiner 132 of the second preliminary operation controller 130 determines whether there is a space in which the vehicle M can proceed in travel paths to the sides of the target object TO (step S3).

When it is determined that there is no space in which the vehicle M can proceed in the travel paths to the sides of the target object TO, the second preliminary operation controller 130 performs the second preliminary operation (step S4). Next, the second preliminary operation controller 130 determines whether the TTC between the vehicle M and the target object TO has increased to be equal to or greater than the third threshold Th3 (step S5). When it is determined that the TTC between the vehicle M and the target object TO has increased to be equal to or greater than the third threshold Th3, the process returns to step S1.

When it is not determined that the TTC between the vehicle M and the target object TO has increased to be equal to or higher than the third threshold Th3, the braking controller 110 determines whether the TTC between the vehicle M and the target object TO is less than the first threshold Th1 (step S6). When it is determined that the TTC between the vehicle M and the target object TO is greater than or equal to the first threshold Th1, the process returns to step S3. When a positive determination is made in step S3, the second preliminary operation is stopped and the process from step S8 onward is performed. When it is determined that the TTC between the vehicle M and the target object TO is less than the first threshold Th1, the braking controller 110 outputs a braking force to the brake device 210 and/or the travel driving force output device 200 to decelerate the vehicle M at the first deceleration B1 and stop the vehicle M (step S7). At this time, avoidance steering may be performed instead of (or in addition to) decelerating and stopping the vehicle M as described above.

When a positive determination is made in step S3, that is, when the TTC between the vehicle M and the target object TO is less than the third threshold Th3 and there is a space in which the vehicle M can proceed in travel paths to the sides of the target object TO, the first preliminary operation controller 112 of the braking controller 110 determines whether the TTC between the vehicle M and the target object TO is less than the second threshold Th2 (step S8). When it is determined that the TTC between the vehicle M and the target object TO is greater than or equal to the second threshold Th2, the process returns to step S1.

When it is determined that the TTC between the vehicle M and the target object TO is less than the second threshold Th2, the first preliminary operation controller 112 performs the first preliminary operation (step S9). Next, the first preliminary operation controller 112 determines whether the TTC between the vehicle M and the target object TO has increased to be equal to or greater than the second threshold Th2 (step S10). When it is determined that the TTC between the vehicle M and the target object TO has increased to be equal to or greater than the second threshold Th2, the process returns to step S1.

When it is not determined that the TTC between the vehicle M and the target object TO has increased to be equal to or higher than the second threshold Th2, the braking controller 110 determines whether the TTC between the vehicle M and the target object TO is less than the first threshold Th1 (step S11). When it is determined that the TTC between the vehicle M and the target object TO is greater than or equal to the first threshold Th1, the process returns to step S3. When a negative determination is made in step S3, the first preliminary operation is stopped and the process from step S4 onward is performed. When it is determined that the TTC between the vehicle M and the target object TO is less than the first threshold Th1, the braking controller 110 outputs the first deceleration B1 to the brake device 210 and/or the travel driving force output device 200 to decelerate and stop the vehicle M (step S7).

Figure 6:
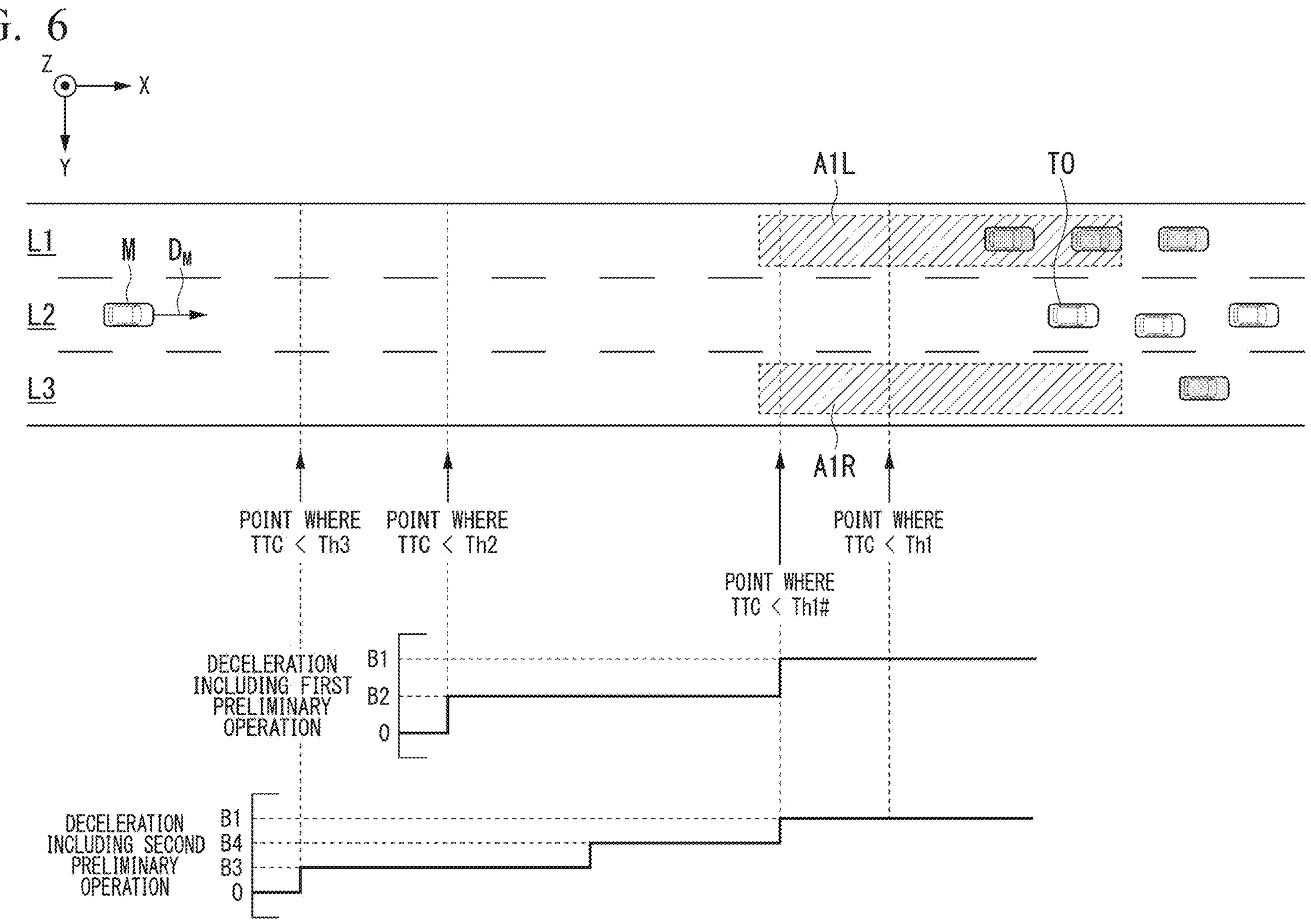
FIG. 6 is a diagram for explaining first braking control when a first preliminary operation or a second preliminary operation that is being executed cannot be continued.

Braking Control in Situation where First Preliminary Operation or Second Preliminary Operation Cannot be Continued Next, a description will be given of braking control when a situation where the first preliminary operation or the second preliminary operation that is being executed cannot be continued (until the operation is completed) has occurred during execution of the first preliminary operation or the second preliminary operation described above. FIG. 6 is a diagram for explaining the first braking control when the first preliminary operation or the second preliminary operation that is being executed cannot be continued. In the following description, details that have been described using FIG. 4 will be omitted and the description will focus on differences from FIG. 4. The same applies to FIG. 7 which will be described later.

First, the determiner 140 determines whether a situation where the first preliminary operation or the second preliminary operation that is being executed cannot be continued has occurred during execution of the first preliminary operation or the second preliminary operation. Cases where a situation where the first preliminary operation or the second preliminary operation that is being executed cannot be executed has occurred include, for example, a case where a situation where the performance of a detection device degrades has occurred. Performance degradation includes, for example, a case where the detection device can detect only up to a certain distance from the vehicle M (for example, about 30 to 50 meters in front of the vehicle M) for some reasons although it can detect up to a certain distance from the vehicle M (for example, about 80 to 100 meters in front of the vehicle M) in normal times. Performance degradation may include, for example, a case where an average brightness of a camera image becomes less than or equal to a threshold value or a case where the reliability of the detection device (for example, the certainty of an object acquired by the object recognition device 16) becomes less than or equal to a threshold value. Performance degradation may also include, for example, a case where vehicles other than the target object TO cannot be recognized among a plurality of vehicles present in front of the vehicle M within a predetermined distance or the reliability of recognition becomes less than or equal to a threshold value. Examples of performance degradation include continuous degradation due to deterioration, failure, or the like of the detection device and temporary degradation due to the effects of the surrounding environment (e.g., heavy rain, sunlight) or the effects of dust adhering to the detection device or the like.

Based on the detection result of the detection device, the determiner 140 determines whether the performance of the detection device has degraded according to the determination conditions described above. The determiner 140 may also obtain the degree of performance degradation of the detection device based on the reliability and the difference from each reference value (threshold value) of the determination conditions described above.

For example, upon determining that the performance of the detection device has degraded, the determiner 140 determines that the situation is such that the first preliminary operation or the second preliminary operation that is being executed cannot be continued. Further, upon determining that the performance of the detection device has not degraded, the determiner 140 determines that the situation is such that the first preliminary operation or the second preliminary operation that is being executed can be continued. If the situation is such that the first preliminary operation or the second preliminary operation that is being executed can be continued, for example, the control as shown in FIG. 4 described above is performed.

When the determiner 140 has determined that the situation is such that the first preliminary operation or the second preliminary operation that is being executed cannot be continued, the first preliminary operation controller 112 stops the first preliminary operation if the first preliminary operation is being executed and the second preliminary operation controller 130 stops the second preliminary operation if the second preliminary operation is being executed. When the determiner 140 has determined that the first preliminary operation or the second preliminary operation that is being executed cannot be continued, the braking controller 110 changes the first condition such that the control for stopping the vehicle M is more easily performed. For example, the braking controller 110 changes the first condition such that braking control for stopping the vehicle M is performed at an earlier time than when the first preliminary operation or the second preliminary operation can be continued (hereinafter referred to as normal times).

For example, as shown in FIG. 6, the braking controller 110 sets a modified threshold Th1 # obtained by increasing the first threshold Th1 for comparison with the TTC, and when the TTC is less than the modified threshold Th1 #, instructs the brake device 210 and/or the travel driving force output device 200 to output a braking force that decelerates the vehicle M at a first deceleration B1. The modified threshold Th1 # is a value smaller than the second threshold Th2. How much the first threshold Th1 is to be increased to the modified threshold Th1 # may be set, for example, based on the speed of the vehicle M and the road condition or may be set based on the degree of performance degradation of the detection device determined by the determiner 140.

Accordingly, braking control can be performed at an earlier time than in normal times and contact with the target object TO can be more reliably prevented. For example, more appropriate driving assistance can be provided by making a change to safer braking control in a situation where the performance of the detection device has degraded.

Instead of (or in addition to) performing braking control for stopping the vehicle M at an earlier time than in normal times, the braking controller 110 may increase the value of the first deceleration B1 for the braking control.

Figure 7:
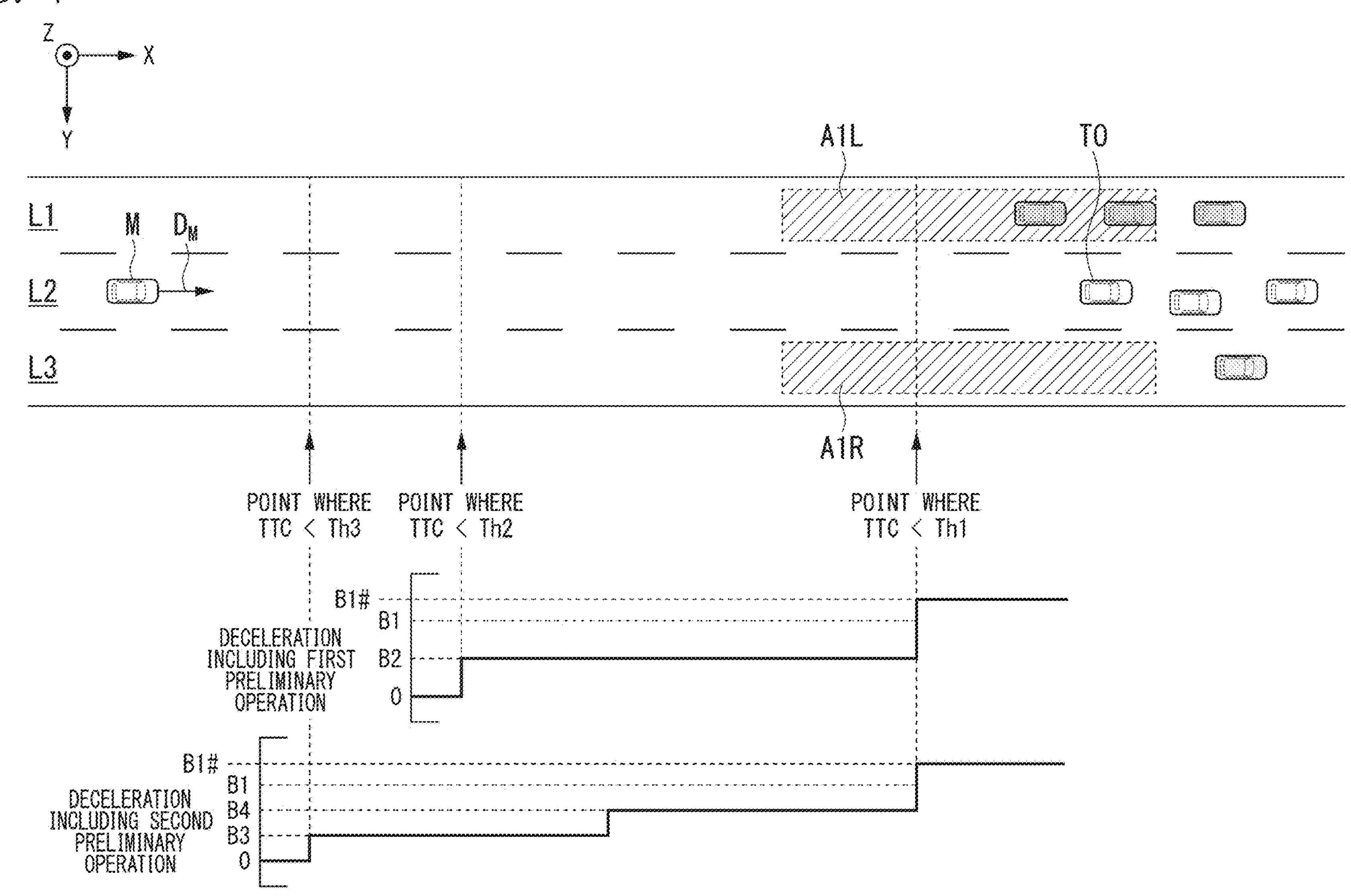
FIG. 7 is a diagram for explaining second braking control when the first preliminary operation or the second preliminary operation that is being executed cannot be continued.

FIG. 7 is a diagram for explaining second braking control when the first preliminary operation or the second preliminary operation that is being executed cannot be continued. In the second braking control shown in FIG. 7, the braking controller 110 instructs the brake device 210 and/or the travel driving force output device 200 to output, for example, a braking force that decelerates the vehicle M at a deceleration B1 # that is greater than the first deceleration B1 when a situation where the first preliminary operation or the second preliminary operation that is being executed cannot be continued has occurred and the first condition is satisfied (the TTC is less than the first threshold Th1). How much the first deceleration B1 is to be increased to the deceleration B1 # may be set, for example, based on the speed of the vehicle M and the road condition or may be set based on the degree of performance degradation of the detection device determined by the determiner 140.

Accordingly, the vehicle M can be stopped in a shorter distance than in normal times and contact with the target object TO can be more reliably prevented. For example, more appropriate driving assistance can be provided by making a change to safer braking control in a situation where the performance of the detection device has degraded.

The braking controller 110 may combine the first braking control and the second braking control described above and thus instruct the brake device 210 and/or the travel driving force output device 200 to output a braking force that decelerates the vehicle at the deceleration B1 # when the TTC is less than the modified threshold Th1 #.

Figure 8:
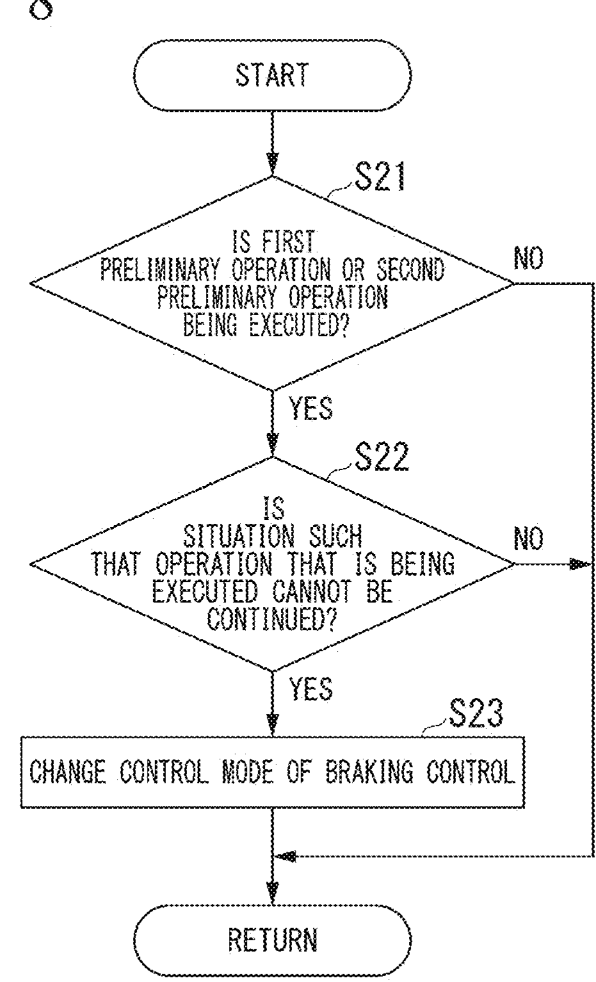
FIG. 8 is a flowchart illustrating an example of a braking control process based on an execution status of the first preliminary operation or the second preliminary operation.

FIG. 8 is a flowchart illustrating an example of a braking control process based on an execution status of the first preliminary operation or the second preliminary operation. The process shown in FIG. 8 is, for example, a process that is repeatedly performed at a predetermined period or time during execution of the process shown in FIG. 5.

In the example of FIG. 8, the determiner 140 determines whether the first preliminary operation or the second preliminary operation is being executed (step S21). Execution of the first preliminary operation corresponds to, for example, the process of step S9 in FIG. 5 and execution of the second preliminary operation corresponds to, for example, the process of step S4 of FIG. 5. When it is determined that the first preliminary operation or the second preliminary operation is being executed, the determiner 140 determines whether the situation is such that the operation that is being executed cannot be continued (step S22). When it is determined that the situation is such that the operation that is being executed cannot be continued, the braking controller 110 changes the control mode of the braking control for stopping the vehicle M in the process of step S7 shown in FIG. 5 (step S23). Then, the process of this flowchart ends. When it is determined in the process of step S21 that the first preliminary operation and the second preliminary operation are not being executed or when it is determined in the process of step S22 that the situation is not such that the operation that is being executed cannot be continued (the situation is such that the operation that is being executed can be continued), the process of this flowchart ends.

When the process in step S23 in FIG. 8 has been performed, the subsequent process in FIG. 8 does not need to be repeatedly performed. When the changed braking control has not been performed and it is determined within a predetermined time that the situation is not such that the operation that is being executed cannot be continued (the situation is such that the operation that is being executed can be continued) after it is determined in the process of step S22 that the situation is such that the operation that is being executed cannot be continued, the braking controller 110 may perform a process of returning the changed control mode to the control mode before change.

Modifications

In the above embodiment, in either the first preliminary operation or the second preliminary operation, the HMI 30 may perform an alert display, audio output, vibration output, or the like instead of outputting the braking force. In this case, examples of executing the second preliminary operation in multiple stages include making the degrees of attention (such as contrast, brightness, and color) of the first display screen and the second and subsequent display screens different, making the content or volumes of the first audio output and the second and subsequent audio outputs different, and making the second and subsequent vibration outputs greater than the first vibration output, instead of outputting the braking force in stages while changing the degree of deceleration as described above.

When changing the control mode of the braking control from the normal mode, the braking controller 110 may instruct the HMI 30 to perform an image display, an audio output, or a vibration output corresponding to information indicating to the occupant of the vehicle M that the control mode of the braking control is to be changed. Thus, even if braking control of the vehicle M different from the normal braking control is performed, it is possible to reduce the anxiety of the occupant by notifying the occupant.

In the above embodiment, lane change is forced during a preliminary operation if a branch path to a destination set in the navigation device 50 is on either the left or right side of a lane in which the vehicle M is traveling. Thus, as a result, the vehicle M can be moved in a direction closer to the destination and the vehicle M can be guided to a state where an object that will become a target object is not near the vehicle M.

In the above embodiment, the determiner 140 may determine whether the first preliminary operation or the second preliminary operation can be executed before executing the first preliminary operation or the second preliminary operation, instead of determining whether a situation where the first preliminary operation or the second preliminary operation that is being executed cannot be continued has occurred during execution of the first preliminary operation or the second preliminary operation. In this case, the braking controller 110 changes the control mode of the braking control as described above when a situation where the first preliminary operation or the second preliminary operation cannot be executed has occurred due to a performance degradation of the detection device or the like.

According to the embodiment described above, a driving assistance device 100 includes a braking controller 110 configured to refer to an output of a detection device configured to detect presence of objects in front of a vehicle M, and when a degree of approach between the vehicle and a target object among the objects satisfies a first condition, perform braking control to instruct a brake device of the vehicle to stop the vehicle and an avoidance steering controller 120 configured to instruct a steering device of the vehicle M to avoid contact with the target object by steering, wherein the braking controller 110 includes a first preliminary operation controller 112 configured to perform a first preliminary operation when the degree of approach satisfies a second condition and further includes a second preliminary operation controller 130 configured to perform a second preliminary operation when the degree of approach satisfies a third condition and it is determined that there is no space in which the vehicle can proceed after performing avoidance steering in any of travel paths to sides of the target object at a time when the third condition is satisfied, the first condition is a condition that is satisfied when the degree of approach is higher than the second condition, the second condition is a condition that is satisfied when the degree of approach is higher than the third condition, and the braking controller 110 is configured to, when a situation where the first preliminary operation or the second preliminary operation that is being executed becomes unable to continue has occurred, change a control mode of the braking control, thereby providing more appropriate driving assistance depending on the situation of the vehicle.

Specifically, according to the embodiment, for example, a situation where the first preliminary operation or the second preliminary operation cannot be performed (non-implementation) has occurred due to a performance limit of the vehicle M when the first preliminary operation or the second preliminary operation is performed, conditions (such as a profile) are changed to make it easier for the braking controller 110 to perform braking control, the priority of the braking control is increased, the time at which the braking control is performed is set to be earlier, or the deceleration G is increased, such that the vehicle can be controlled more safely.

The embodiment described above can be expressed as follows.

A driving assistance device including:

a storage medium configured to store computer-readable instructions; and a processor connected to the storage medium, the processor executing the computer-readable instructions to:

perform either or both of referring to an output of a detection device configured to detect presence of objects in front of a vehicle, and when a degree of approach between the vehicle and a target object among the objects satisfies a first condition, performing braking control to instruct a brake device of the vehicle to stop the vehicle or instructing a steering device of the vehicle to avoid contact with the target object by steering;

perform a first preliminary operation when the degree of approach between the target object and the vehicle satisfies a second condition;

perform a second preliminary operation when the degree of approach between the target object and the vehicle satisfies a third condition and it is determined that there is no space in which the vehicle can proceed after performing avoidance steering in any of travel paths to sides of the target object at a time when the third condition is satisfied, the first condition being a condition that is satisfied when the degree of approach is higher than the second condition, the second condition being a condition that is satisfied when the degree of approach is higher than the third condition; and change a control mode of the braking control when a situation where the first preliminary operation or the second preliminary operation that is being executed becomes unable to continue has occurred.

Although the modes for carrying out the present invention have been described above by way of embodiments, the present invention is not limited to these embodiments at all and various modifications and substitutions can be made without departing from the gist of the present invention.

REFERENCE SIGNS LIST

10 Camera
12 Radar device
14 LIDAR device
16 Object recognition device
80 Driving operator
100 Driving assistance device
110 Braking controller
112 First preliminary operation controller
120 Avoidance steering controller
130 Second preliminary operation controller
132 Avoidance steering possibility determiner
140 Determiner
200 Travel driving force output device
210 Brake device
220 Steering device

What is claim is:

1. A driving assistance device comprising:

a braking controller configured to refer to an output of a detection device configured to detect presence of objects in front of a vehicle, and when a degree of approach between the vehicle and a target object among the objects satisfies a first condition, perform braking control to instruct a brake device of the vehicle to stop the vehicle; and an avoidance steering controller configured to instruct a steering device of the vehicle to avoid contact with the target object by steering, wherein the braking controller includes a first preliminary operation controller configured to perform a first preliminary operation when the degree of approach satisfies a second condition and further includes a second preliminary operation controller configured to perform a second preliminary operation when the degree of approach satisfies a third condition and it is determined that there is no space in which the vehicle can proceed after performing avoidance steering in any of travel paths to sides of the target object at a time when the third condition is satisfied, the first condition is a condition that is satisfied when the degree of approach is higher than the second condition, the second condition is a condition that is satisfied when the degree of approach is higher than the third condition, and the braking controller is configured to change a control mode of the braking control when a situation where the first preliminary operation or the second preliminary operation that is being executed becomes unable to continue has occurred.

2. The driving assistance device according to claim 1, wherein the situation where the first preliminary operation or the second preliminary operation that is being executed becomes unable to continue includes a situation where performance of the detection device degrades.

3. The driving assistance device according to claim 1, wherein the braking controller is configured to change the first condition such that control for stopping the vehicle is more easily performed when the first preliminary operation or the second preliminary operation that is being executed becomes unable to continue.

4. The driving assistance device according to claim 3, wherein the braking controller is configured to, when the first preliminary operation or the second preliminary operation that is being executed becomes unable to continue, change the first condition such that control for stopping the vehicle is performed at an earlier time than when the first preliminary operation or the second preliminary operation is able to continue.

5. The driving assistance device according to claim 1, wherein the braking controller is configured to, when the first preliminary operation or the second preliminary operation that is being executed becomes unable to continue and control for stopping the vehicle is performed, instruct the brake device of the vehicle to output a greater braking force than when the first preliminary operation or the second preliminary operation is able to continue.

6. The driving assistance device according to claim 1, wherein the second preliminary operation is an operation that starts at an earlier time than the first preliminary operation.

7. The driving assistance device according to claim 1, wherein at least one of the first preliminary operation and the second preliminary operation is an operation of instructing the brake device to output a braking force smaller than a braking force that the braking controller instructs the brake device to output.

8. The driving assistance device according to claim 1, wherein the braking controller is configured to instruct an output device to perform an image display, an audio output, or a vibration output indicating that the control mode of the braking control is to be changed.

9. A driving assistance method comprising:

by a computer, performing at least one of referring to an output of a detection device configured to detect presence of objects in front of a vehicle, and in response to a degree of approach between the vehicle and a target object among the objects satisfying a first condition, performing braking control to instruct a brake device of the vehicle to stop the vehicle or instructing a steering device of the vehicle to avoid contact with the target object by steering;

performing a first preliminary operation in response to the degree of approach between the target object and the vehicle satisfying a second condition;

performing a second preliminary operation in response to the degree of approach between the target object and the vehicle satisfying a third condition and it is determined that there is no space in which the vehicle can proceed after performing avoidance steering in any of travel paths to sides of the target object at a time in response to the third condition being satisfied, the first condition being a condition that is satisfied in response to the degree of approach is being higher than the second condition, the second condition being a condition that is satisfied in response to the degree of approach is being higher than the third condition; and changing a control mode of the braking control in response to a situation where the first preliminary operation or the second preliminary operation that is being executed becoming unable to continue occurs.

10. A non-transitory computer-readable storage medium that stores a program to be executed by a computer to perform at least:

perform at least one of referring to an output of a detection device configured to detect presence of objects in front of a vehicle, and in response to a degree of approach between the vehicle and a target object among the objects satisfying a first condition, performing braking control to instruct a brake device of the vehicle to stop the vehicle or instructing a steering device of the vehicle to avoid contact with the target object by steering;

perform a first preliminary operation in response to the degree of approach between the target object and the vehicle satisfying a second condition;

perform a second preliminary operation in response to the degree of approach between the target object and the vehicle satisfying a third condition and it is determined that there is no space in which the vehicle can proceed after performing avoidance steering in any of travel paths to sides of the target object at a time in response to the third condition is being satisfied, the first condition being a condition that is satisfied in response to the degree of approach being higher than the second condition, the second condition being a condition that is satisfied in response to the degree of approach being higher than the third condition; and change a control mode of the braking control in response to a situation where the first preliminary operation or the second preliminary operation that is being executed becoming unable to continue occurs.

* * * * *